US012576460B2

(12) United States Patent
Kumkar et al.

(10) Patent No.: US 12,576,460 B2
(45) Date of Patent: Mar. 17, 2026

(54) METHOD FOR MACHINING A WORKPIECE

(71) Applicant: TRUMPF Laser—und Systemtechnik GmbH, Ditzingen (DE)

(72) Inventors: Malte Kumkar, Weimar (DE); Myriam Kaiser, Ditzingen (DE)

(73) Assignee: TRUMPF LASER—UND SYSTEMTECHNIK GMBH, Ditzingen (DE)

( * ) Notice: Subject to any disclaimer, the term of this patent is extended or adjusted under 35 U.S.C. 154(b) by 953 days.

(21) Appl. No.: 17/669,460

(22) Filed: Feb. 11, 2022

(65) Prior Publication Data

US 2022/0184744 A1     Jun. 16, 2022

Related U.S. Application Data

(63) Continuation of application No. PCT/EP2020/072754, filed on Aug. 13, 2020.

(30) Foreign Application Priority Data

Aug. 13, 2019    (DE) ..................... 10 2019 121 827.6

(51) Int. Cl.
    *B23K 26/362*        (2014.01)
    *B23K 26/0622*       (2014.01)
    *B23K 26/382*        (2014.01)

(52) U.S. Cl.
    CPC ........ *B23K 26/362* (2013.01); *B23K 26/0624* (2015.10); *B23K 26/382* (2015.10)

(58) Field of Classification Search
    CPC ........ B23K 26/53; B23K 26/55; B23K 26/36; B23K 26/38; C03C 15/00; C03C 15/025
    See application file for complete search history.

(56) References Cited

U.S. PATENT DOCUMENTS

| | | | | |
|---|---|---|---|---|
| 4,894,115 | A | * | 1/1990 | Eichelberger ..... H01L 21/76804 134/1 |
| 5,227,013 | A | * | 7/1993 | Kumar .................. H01L 21/486 219/121.85 |
| 6,979,797 | B2 | * | 12/2005 | Rivas ..................... B41J 2/1603 219/121.69 |
| 7,666,320 | B2 | * | 2/2010 | Kawamura .......... B23K 26/009 134/28 |

(Continued)

FOREIGN PATENT DOCUMENTS

| | | |
|---|---|---|
| CN | 105246850 A | 1/2016 |
| CN | 107531564 A | 1/2018 |

(Continued)

*Primary Examiner* — Jimmy Chou

(74) *Attorney, Agent, or Firm* — LEYDIG, VOIT & MAYER, LTD.

(57) ABSTRACT

The present invention relates to a method for machining a workpiece, comprising the steps of introducing a plurality of adjacent modifications into the material of the workpiece by means of laser radiation, etching the material of the workpiece in a first etching operation with a first selectivity, in order to remove predominantly the material modified by the laser radiation, and, after completion of the first etching operation, etching the material of the workpiece in a second etching operation with a second selectivity, different from the first selectivity, in order to remove the webs left between the removed modified material.

9 Claims, 5 Drawing Sheets

(56)                     References Cited

U.S. PATENT DOCUMENTS

| | | | | |
|---|---|---|---|---|
| 7,887,712 | B2 * | 2/2011 | Boyle | B23K 26/123 |
| | | | | 216/65 |
| 9,102,007 | B2 * | 8/2015 | Hosseini | B23K 26/0624 |
| 9,102,011 | B2 * | 8/2015 | Hosseini | B23K 26/356 |
| 10,391,588 | B2 * | 8/2019 | Hosseini | B23K 26/0622 |
| 10,580,725 | B2 * | 3/2020 | Huang | H01L 23/49827 |
| 11,014,199 | B2 * | 5/2021 | Beyer | B23K 26/53 |
| 2002/0000037 | A1 * | 1/2002 | Chou | H05K 3/423 |
| | | | | 29/846 |
| 2003/0047545 | A1 * | 3/2003 | McKee | B23K 26/0613 |
| | | | | 219/121.76 |
| 2005/0011873 | A1 * | 1/2005 | Withford | B23K 26/066 |
| | | | | 219/121.69 |
| 2005/0064137 | A1 * | 3/2005 | Hunt | B23K 26/361 |
| | | | | 428/188 |
| 2010/0025387 | A1 * | 2/2010 | Arai | B29C 65/1654 |
| | | | | 219/121.73 |
| 2010/0133245 | A1 * | 6/2010 | Koops | B41M 5/262 |
| | | | | 219/121.69 |
| 2012/0196071 | A1 * | 8/2012 | Cornejo | C03C 15/02 |
| | | | | 65/60.5 |
| 2012/0295066 | A1 | 11/2012 | Nukaga et al. | |
| 2013/0126573 | A1 * | 5/2013 | Hosseini | B23K 26/0006 |
| | | | | 225/2 |
| 2013/0183837 | A1 * | 7/2013 | Arai | H01L 21/67092 |
| | | | | 438/795 |
| 2014/0083986 | A1 * | 3/2014 | Zhang | B23K 26/40 |
| | | | | 219/121.68 |
| 2014/0147624 | A1 * | 5/2014 | Streltsov | B23K 26/361 |
| | | | | 65/30.14 |
| 2014/0199519 | A1 * | 7/2014 | Schillinger | B23K 26/53 |
| | | | | 219/121.75 |
| 2014/0213040 | A1 * | 7/2014 | Morikazu | H01L 21/78 |
| | | | | 438/462 |
| 2014/0248757 | A1 * | 9/2014 | Morikazu | H01L 21/78 |
| | | | | 438/463 |
| 2015/0034734 | A1 * | 2/2015 | Rivas | B41J 2/1642 |
| | | | | 216/27 |
| 2015/0136743 | A1 * | 5/2015 | Hosseini | C03B 33/091 |
| | | | | 219/121.61 |
| 2015/0166394 | A1 * | 6/2015 | Marjanovic | B23K 26/0884 |
| | | | | 428/192 |
| 2015/0367442 | A1 * | 12/2015 | Bovatsek | C03B 33/0222 |
| | | | | 65/112 |
| 2016/0009586 | A1 * | 1/2016 | Bookbinder | C03B 33/06 |
| | | | | 65/112 |
| 2016/0031745 | A1 * | 2/2016 | Ortner | C03B 33/0222 |
| | | | | 65/157 |
| 2016/0059359 | A1 * | 3/2016 | Krueger | B23K 26/402 |
| | | | | 65/158 |
| 2016/0060156 | A1 * | 3/2016 | Krueger | B23K 26/0619 |
| | | | | 65/102 |
| 2016/0152508 | A1 * | 6/2016 | Kumkar | B28D 1/221 |
| | | | | 65/355 |
| 2016/0152516 | A1 | 6/2016 | Bazemore et al. | |
| 2016/0322291 | A1 * | 11/2016 | Goers | H01L 23/49894 |
| 2017/0103249 | A1 * | 4/2017 | Jin | B23K 26/53 |
| 2017/0256422 | A1 * | 9/2017 | Ambrosius | H01L 21/486 |
| 2017/0259375 | A1 * | 9/2017 | Kumkar | B23K 26/064 |
| 2017/0276951 | A1 * | 9/2017 | Kumkar | B23K 26/066 |
| 2018/0029924 | A1 * | 2/2018 | Inoue | C03B 33/0222 |
| 2018/0029933 | A1 | 2/2018 | Na Zou et al. | |
| 2018/0097164 | A1 * | 4/2018 | Katsumata | H01L 23/49805 |
| 2018/0126484 | A1 * | 5/2018 | Richter | B23K 26/40 |
| 2018/0345419 | A1 * | 12/2018 | Mikutis | B23K 26/0006 |
| 2019/0119150 | A1 * | 4/2019 | Burket | C03C 23/0025 |
| 2019/0148641 | A1 * | 5/2019 | Kim | B23K 26/0624 |
| | | | | 219/121.69 |
| 2020/0009691 | A1 * | 1/2020 | Ostholt | B81C 1/00087 |
| 2020/0376603 | A1 | 12/2020 | Ortner et al. | |

FOREIGN PATENT DOCUMENTS

| | | | | |
|---|---|---|---|---|
| DE | 102014116958 | B4 | 6/2017 | |
| DE | 102017106372 | A1 | 9/2018 | |
| JP | 2011037707 | A | 2/2011 | |
| JP | 2011083787 | A | 4/2011 | |
| JP | 2015182910 | A | 10/2015 | |
| JP | 2016534008 | A | 11/2016 | |
| JP | 2018081242 | A | 5/2018 | |
| WO | WO 2011096356 | A1 | 8/2011 | |
| WO | WO 2016041544 | A1 | 3/2016 | |
| WO | WO 2016079062 | A1 | 5/2016 | |
| WO | WO 2016129254 | A1 | 8/2016 | |
| WO | WO-2018162385 | A1 * | 9/2018 | C03C 15/00 |
| WO | WO 2019158488 | A1 | 8/2019 | |

* cited by examiner

METHOD FOR MACHINING A WORKPIECE

CROSS REFERENCE TO RELATED APPLICATIONS

This application is a continuation of PCT International Application No. PCT/EP2020/072754 (WO 2021/028534 A1), filed on Aug. 13, 2020, and claims benefit to German Patent Application No. DE 10 2019 121 827.6, filed on Aug. 13, 2019. The aforementioned applications are hereby incorporated by reference herein.

FIELD

The present invention relates to a method for machining a workpiece, in particular for introducing at least one cutout or aperture into the workpiece, by means of laser etching.

BACKGROUND

In laser etching, a material that is transparent to the laser radiation used is modified by means of one or more ultrashort laser pulses, at the focal point of which non-linearly induced absorption processes take place, for example multiphoton absorptions or tunnel ionization. The chemical and/or physical properties of the material are thereby modified in such a way that the material can be etched better. In a subsequent step, the modified material is then selectively removed by an etching process.

Selectivity of the etching operation is understood here as meaning the ratio between the etching rate in the case of modified material and the etching rate in the case of unmodified material.

If during the etching operation the unmodified material is also removed (though more slowly), it is not possible in one process to produce precise contours of different sizes in a workpiece just, and directly, by the geometry of the modifications introduced. With a drawn-out modification all the way through over the entire material thickness as shown in FIG. 1a, different voids can be produced in transparent materials depending on the etching attack. In a selective etching step with high selectivity, for example, predominantly only the modified material is attacked, whereas the unmodified material is to the greatest extent resistant. In this way, for example, through-holes of a diameter that remains the same over the entire material thickness can be produced in transparent material (see FIG. 1b). If, instead of an etching step with high selectivity, an etching step with low selectivity is carried out after the modifying, both modified material and (to a lesser extent) non-modified material can be etched. In this way, hourglass-shaped through-holes can be produced from drawn-out laser modifications (see FIG. 1c). With this process, the ratio of the diameters from the entry/exit to the waist can be set by way of the etching time. With high etching times, however, a less selective etching step may lead to a reduction in the material thickness $\Delta h$. Furthermore, the minimum diameter of the through-holes near the surface, by way of which etching access takes place, is accordingly dependent on the material thickness.

WO 2018/162385 A1 describes a method for laser etching in which different modifications are introduced into the transparent material by changing the laser parameters. As a result, in the subsequent etching step a different selectivity can be achieved according to the type of modification.

SUMMARY

In an aspect, the present invention provides a method for machining a workpiece. The method includes the steps of introducing a plurality of adjacent modifications into the material of the workpiece by means of laser radiation, etching the material of the workpiece in a first etching operation with a first selectivity, in order to remove predominantly the material modified by the laser radiation, and after completion of the first etching operation, etching the material of the workpiece in a second etching operation with a second selectivity different from the first selectivity, in order to remove the webs left between the removed modified material.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figures 1A, 1B, 1C, 1D:
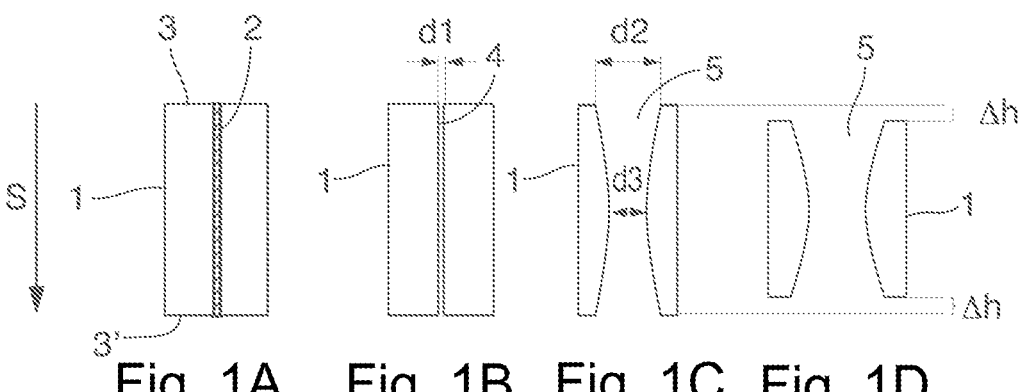
FIGS. 1A, 1B, 1C, and 1D show a schematic representation of a method for laser etching.

The present invention provides an improved method for machining workpieces by means of laser etching.

Correspondingly, a method for machining a workpiece is proposed, comprising the steps of introducing a plurality of adjacent modifications into the material of the workpiece by means of laser radiation, then etching the material of the workpiece in a first etching operation with a first selectivity, in order to remove predominantly the material modified by the laser radiation, and then, after completion of the first etching operation, etching the material of the workpiece (1) in a second etching operation with a second selectivity, different from the first selectivity, in order to remove the webs left between the removed modified material.

The modification may bring about a changed behavior of the modified material in comparison with an etchant. In order that the modification can be introduced not only at the surface but also at deeper locations of the workpiece, the material of the workpiece is preferably transparent at least to the wavelength of the laser radiation used. In order to avoid or reduce losses when the laser radiation enters the material, the surface should as far as possible be smooth and free from contaminants. The material may be for example glass, transparent ceramic, glass ceramic or sapphire.

The modification of the material of the workpiece may take place in particular by means of a laser beam in the form of a Bessel beam, in particular a quasi-Bessel beam (also referred to hereinafter simply as a Bessel beam) with a drawn-out focal zone. This drawn-out focal zone has a beam profile that remains essentially the same over the machining length (for example over the thickness of the workpiece). In practice, drawn-out focal zones with a length of over 10 mm can already be produced. The production of such quasi-Bessel beams is described for example in DE 10 2014 116 958 B4 and in WO 2016/079062 A1.

The modification of the material of the workpiece may also take place by means of a laser beam in the form of a focused Gaussian beam, here the modification of the material taking place essentially at the focal point of the laser beam.

The laser source may be arranged movably with respect to the workpiece, in particular at least in two spatial directions perpendicular to the direction of propagation of the laser beam, but also displaceably in all spatial directions. In the case of displaceability in three spatial directions, the focal point of the laser beam can be moved in the desired way parallel and perpendicular to the surface of the workpiece.

Multiple modifications introduced one after the other can be introduced into the material of the workpiece separately from one another, so that they do not overlap. This reduces the loading of the workpiece and reduces the risk of cracks or other damage within the workpiece. Alternatively, modifications introduced one after the other may overlap, and consequently provide a contiguous modification. Such overlapping modifications are considered here and hereinafter as one modification. A combination of overlapping and non-overlapping modifications is also possible.

A modification may for example extend from the working surface of the workpiece (i.e. from the surface through which the laser beam enters the workpiece) to a defined depth (as seen from the working surface) of the workpiece, in particular linearly and along the direction of propagation of the laser beam. For this purpose, for example, a Bessel beam with a focal zone that is shorter than the material thickness may be used, or a Bessel beam with a longer focal zone may be positioned such that the modification does not take place over the entire material thickness. By means of a Bessel beam with a focal zone that is shorter than the material thickness, modifications which do not have any direct connection to a surface of the workpiece can also be incorporated in the interior of the workpiece. A modification may also extend over the entire thickness of the workpiece, i.e. from the working surface to the opposite surface of the workpiece.

After introducing the at least one modification, the workpiece is subjected to an etching operation with varying selectivity. The selectivity of the etching operation is understood in this case as meaning the ratio between the etching rate in the case of modified material and the etching rate in the case of unmodified material. The selectivity of the etching operation may be set in particular by the chemical composition, the temperature and/or the concentration of the etchant.

The etching operation may be a liquid etching operation, a dry etching operation or a vapor-phase etching operation. In the case of a liquid etching operation, an aqueous solution of KOH may be used for example as the etchant. For example, the etching operation may be a liquid etching operation which is carried out in an ultrasonic bath. The selectivity of the etching operation may then also be set by way of the ultrasonic power introduced.

In order to vary the selectivity of the etching operation, one or more of the parameters that are determinative for the selectivity may be changed during the etching operation. For example, the temperature may be increased or reduced. As a result, the selectivity changes during the etching operation.

Depending on the selectivity of the etching operation or the respective phase of the etching operation, then predominantly or almost exclusively the modified material is removed and only to a lesser extent or scarcely the unmodified material.

It is also provided that the etching operation with varying selectivity comprises two or more etching operations each with fixed selectivity. For example, the workpiece may first be subjected to a first etching operation with a first selectivity and—after completion of the first etching operation—to a second etching operation with a second selectivity. In particular, a different etchant may be used here in the two etching operations.

In this case, the modified material of the workpiece is removed in the first etching operation. The first etching operation has a first selectivity, i.e. the ratio between the etching rate in the case of modified material and the etching rate in the case of unmodified material has a first value. The modified material is in this case etched more quickly than the unmodified material, so that the material of the workpiece is removed predominantly along the modification.

During the first etching operation, the workpiece is for example placed into a bath of a first etching solution with a first concentration and a first temperature for a first time. Preferably, the bath is an ultrasonic bath, i.e. a first ultrasonic power is introduced into the bath.

After completion of the first etching operation, the workpiece is subjected to a second etching operation. In this case, the material of the workpiece is removed in the second etching operation. The second etching operation has a second selectivity, i.e. the ratio between the etching rate in the case of modified material and the etching rate in the case of unmodified material has a second value.

Correspondingly, predominantly the material modified by the laser radiation can be removed by the etching of the material in a first etching operation with high selectivity. Then, the webs of unmodified material left between the removed modified material can be removed by the etching of the material in a second etching operation with lower selectivity. Access for the second etching solution is created by the channels formed during the first etching operation, and the second etching solution can attack the webs over their entire length. In this way, the webs can be quickly removed and the effect of the second etching operation on the rest of the workpiece can be minimized. This allows in particular cutouts of any desired form to be introduced into the workpiece.

The first selectivity and the second selectivity are of different magnitudes. Here, too, the modified material is etched more quickly than the unmodified material, so that the material of the workpiece is removed predominantly along the modification, but the ratio of the etching rates is different in the second etching operation from the ratio in the first etching operation.

During the second etching operation, the workpiece is for example placed into a bath of a second etching solution with a second concentration and a second temperature for a second time. Preferably, the bath is an ultrasonic bath, i.e. a second ultrasonic power is introduced into the bath. The workpiece may also be left in the first bath for the second etching operation and the parameters of the bath that are determinative for the selectivity are changed, for example the temperature and/or the ultrasonic power are increased or reduced.

The first etching operation and the second etching operation may differ by the chemical composition, the temperature and/or the concentration of the etching solutions and/or by the ultrasonic power introduced in an ultrasonic bath. The selectivities of the two etching operations can be set by these parameters.

In particular, the first selectivity and the second selectivity may differ by at least a factor of 2, preferably by a factor of 100, more preferably by a factor of 10 000.

In some embodiments of the method, the first selectivity is greater than the second selectivity. This means that the modified material is removed more quickly in relation to the unmodified material during the first etching operation than during the second etching operation.

As a result, it is possible for example to remove essentially only the modified material during the first etching operation (high selectivity, for example a selectivity of at least 1000). This allows the creation of a channel into which the second etching solution can penetrate during the second etching operation and along which the second etching solution can then also remove the non-modified material (lower selectivity, for example a selectivity of at most 100). The second etching solution can then act inside the channel already from the beginning of the second etching operation and widen the channel more quickly to the desired diameter, so that the change in the thickness of the workpiece can be minimized.

In a further embodiment, the introduction of at least one modification comprises the introduction of a plurality of adjacent modifications into the material by means of laser radiation. The modifications may for example be introduced linearly, along a contour or in a two-dimensional or three-dimensional arrangement (regularly in the form of a grid or irregularly). Modifications are regarded as adjacent in particular whenever the spacing between them is no more than five times, preferably once, the diameter of the respective modifications.

The plurality of modifications may in particular be arranged within a desired area for a cutout in the workpiece, for example within a circle or a polygon, or within some other, even irregular, area.

All of the modifications of the plurality of modifications may have the same length. At least some of the modifications may also have different lengths. All or at least some of the modifications may have the same alignment, i.e. be parallel to one another. All or at least some of the modifications may have a starting point in a common plane, for example all or at least some of the modifications may extend from the working surface into the workpiece.

If the modifications are arranged within an area, the angle of the side wall of a cutout can be determined by a corresponding selection of the lengths of the modifications. For example, one or more modifications with the greatest length may be arranged in the middle of the cutout and the length of the modifications may decrease toward the edge of the cutout.

The lengths of the modifications introduced into the material of the workpiece are preferably different in the direction of propagation of the laser beam used.

In a further embodiment, a plurality of modifications are introduced into the material in series with one another along a contour. A contour is understood here as meaning a preselected path, which corresponds for example to the circumference of a geometrical figure (for example a circle, an ellipse, a polygon, etc.), but may also be irregularly shaped. As long as the path does not cross itself, or at least come close, most of the modifications each have only two adjacent modifications. Even if in the case of a grid-shaped arrangement over an area the modifications are introduced into the material one after the other, and consequently also along a path, such an arrangement is not considered here as "along a contour".

In a further embodiment, the contour along which the modifications are introduced into the material is closed, i.e. it surrounds an area completely (with a spacing of course between every two adjacent modifications). Such a contour may in particular correspond to the circumference of a geometrical figure (for example a circle, an ellipse, a polygon, etc.). All modifications along this contour extend over the thickness of the workpiece, i.e. from the working surface to the opposite surface of the workpiece. The etching of the material in a first etching operation with high selectivity predominantly removes the material modified by the laser radiation, so that the region surrounded by the contour and the region outside the contour are still connected by way of webs of unmodified material. The etching of the material in a second etching operation then removes the webs left between the removed modified material, so that the region of the material enclosed by the contour is separated from the region outside and can be removed.

In some embodiments of the method, the first selectivity is less than the second selectivity. This means that the modified material is removed more slowly in relation to the unmodified material during the first etching operation than during the second etching operation.

In an embodiment in which the first selectivity is less than the second selectivity, two parts of the workpiece are separated from one another by the second etching operation with high selectivity. This may take place in particular by a series of adjacent modifications, which all extend over the thickness of the workpiece, i.e. from the working surface to the opposite surface of the workpiece, being introduced into the material of the workpiece and the modified material being removed by the second etching process with high selectivity. Adjacent modifications may overlap or may be separated from one another. With a sufficiently small spacing between non-overlapping modifications (for example less than five times the diameter of the modification), the two parts of the workpiece can be mechanically separated from one another, for example by being pulled apart, after the second etching operation. Depending on process parameters, the two parts may also be separated from one another of their own accord already during the second etching operation, since, as a result of the modifications in unmodified regions, microcracks can occur between the modifications and spread.

In the first etching process with low selectivity taking place before that, both the modified material and (depending on the level of the lower selectivity, possibly at a lower rate) the unmodified material are removed along the series of modifications, whereby a rounding may be created on both sides of the series of modifications. After the above-described separation of the two parts of the workpiece, these roundings in each case provide a rounded edge (also referred to as a bevel or chamfer) of the two parts.

A further third etching operation with low selectivity or even with selectivity 1 (i.e. modified and unmodified material are etched at the same rate, that is to say there is no selectivity) may be performed in order in particular to smooth the separating surfaces.

In further embodiments of the method, after completion of the etching of the material in the second etching operation, one or more further etching operations may take place, each with a different selectivity, i.e. the selectivity of each further etching operation may differ from the selectivity of the preceding etching operation. The selectivities of the further etching operations may correspond to the selectivities of the first two etching operations or be different from them. For example, after completion of the etching of the material in the second etching operation, one or more further etching operations may alternately take place, with a first selectivity and a second selectivity. Consequently, in particular whenever modification passing through the material over the thickness of the workpiece is not possible, then in the etching operations with high selectivity essentially the modified material may be removed and in the etching operations with low selectivity also the unmodified material may be removed, whereby in turn access can be created to further regions with modified material that previously could not be reached by the etching solution. These further regions with modified material can then again be removed by means of an etching operation with high selectivity, without the unmodified material also being removed to any appreciable extent during this.

With the aid of multispot modifications, i.e. modifications with multiple modified regions in the longitudinal direction and in the transversal direction, complex structures (for example lenses) can also be introduced into transparent materials when using etching solutions of different selectivities.

Preferably, the material of the workpiece is transparent to the wavelength of the laser radiation.

Preferably, the modifications are introduced into the material of the workpiece by ultrashort laser pulses.

The proposed method has the advantage over other methods for material machining (such as for example laser drilling) that no stresses or only minor stresses, which under loading or in the course of time may lead to cracks in the material, are introduced into the material. This applies in particular whenever adjacent modifications do not overlap, so that an unmodified region remains between them.

The present invention also relates to a workpiece with a plurality of drawn-out holes, which have been produced by a method according to the invention. Such a workpiece may be in particular a sieve made of glass, transparent ceramic, glass ceramic or sapphire with a plurality of through-holes from one surface to an opposite surface. Preferably, the through-holes have an essentially constant diameter over their length. In one embodiment, the through-holes have a diameter of less than 1 μm, for example approximately 500 nm ("nanosieve").

Exemplary embodiments are described below with reference to the figures. In this case, identical, similar or identically acting elements are provided with identical reference signs in the various figures, and a repeated description of these elements is dispensed with in some instances, in order to avoid redundancies.

FIGS. 1-6, 7a, and 9-11 each show a section through a workpiece 1 along the direction of beam propagation S of a laser beam used for introducing the modifications 2. FIGS. 7b and 8 show a plan view of the respective workpiece 1.

In FIG. 1, a known method for laser etching is schematically shown. FIG. 1a shows a detail from a workpiece 1 with a thickness h. A drawn-out modification 2 all the way through, which extends from one surface 3 to another, opposite surface 3', has been introduced into the material of the workpiece 1 by means of laser radiation to which the material of the workpiece 1 is transparent. In FIG. 1b, the workpiece 1 is shown after the modified material has been attacked by the etching solution and removed in a selective etching step with high selectivity. As a result of the high selectivity of the etching step, the unmodified material has not been attacked, or only insignificantly. As a result, a through-hole 4 with a diameter d1 that remains essentially the same has been created in the workpiece 1.

In FIG. 1c, the workpiece1 is shown after both the modified material and to a lesser extent the unmodified material have been attacked by the etching solution and removed in an etching step with low selectivity instead of the etching step with high selectivity. Since, over the time that the etching operation takes until the modified material has been removed all the way through, the unmodified material near the surfaces 3, 3' is exposed to the etching solution for longer, an hourglass-shaped through-hole 5 with an outside diameter d2 and a smaller diameter d3 at the waist has been created. With this method, the waist diameter d3 can be set by way of the etching time.

With high etching times (for example in order to achieve a large waist diameter d3), in a less selective etching step, in which the unmodified material is attacked along the entire surface of the workpiece 1, there may however be a reduction in the material thickness. This is schematically shown in FIG. 1d, in which the thickness of the workpiece 1 after a long-lasting etching operation with low selectivity has been reduced by 2Δh in comparison with the thickness of the workpiece 1 after an only short etching operation with low selectivity.

With this method, the ratio of the diameter d2 of the entry/exit to the waist diameter d3 can only be set by way of the selectivity. Such a method with fixed selectivity is therefore very inflexible.

Figures 2A, 2B, 2C:
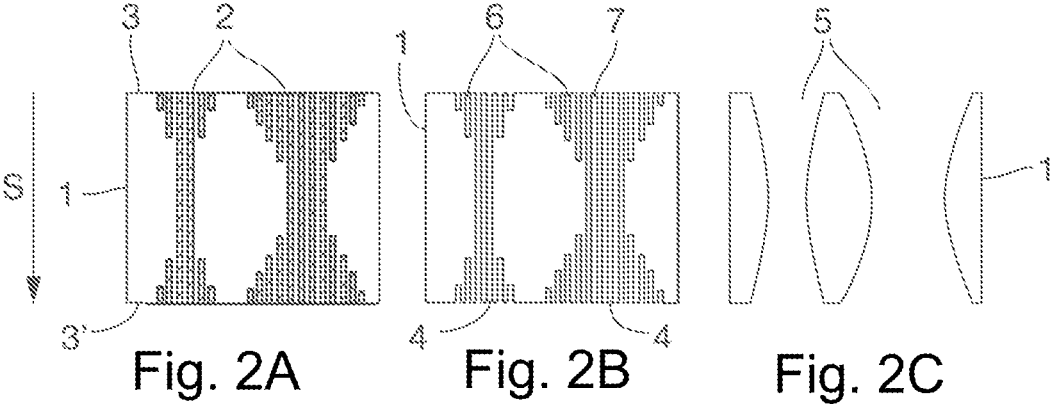
FIGS. 2A, 2B, and 2C show a schematic representation of a method for laser etching according to an embodiment of the invention.

In FIG. 2, an embodiment of a method according to the invention for laser etching is schematically shown. In this embodiment, hourglass-shaped through-holes are produced with minimal material loss along the surfaces, and consequently minimal reduction of the thickness, by separate etching operations with different selectivities. For this purpose, as shown in FIG. 2a, first multiple drawn-out modifications 2 are introduced into the material of the workpiece 1. The modifications 2 each extend from a surface 3, 3' to a desired depth or else all the way through from one surface 3 to the opposite surface 3'. The modifications 2 are essentially distributed over the volume that is to be removed in the subsequent etching steps in order to produce the hourglass-shaped through-hole 5. In this figure, as well as in all of the other figures, in each case a section through the workpiece 1 is shown along the direction of beam propagation S and the modifications 2 lie in the sectional plane. It goes without saying that the modifications 2 may be arranged not only in a plane but also distributed in a volume (that is to say in front of and/or behind the plane of the drawing).

FIG. 2*b* shows the workpiece 1 after the modified material has been attacked by the etching solution and removed in a first etching operation with high selectivity. As a result of the high selectivity of the etching operation, the unmodified material has not been attacked, or only insignificantly. As a result, through-holes 4 and blind holes 6 with a diameter that remains essentially the same have been created in the workpiece 1. The unmodified material that has not been removed in the first etching operation remains between the through-holes 4 and the blind holes 6 in the form of webs 7.

These webs 7 are attacked and removed in a second etching operation with low selectivity. The resultant workpiece 1 is shown in FIG. 2*c*. As a result of the removal of the modified material and the webs 7, hourglass-shaped through-holes 5 have been created. In this way, hourglass-shaped through-holes 5 with different diameters can be produced in a workpiece 1 within the same process, since the diameter of the holes is determined by way of the number of modifications 2 and not by way of the duration of the etching operation. Consequently, the resultant thickness of the workpiece is also not dependent on the diameter to be achieved.

As a result of the selective etching, here, as also in the other embodiments, an etching access for the less selectively acting etching solution is created. As a result, the less selective etching operation can take place right away over the entire length of the modifications removed in the first etching operation, and does not have to first "make its way" inward from the surface of the workpiece 1. The exposure time to the less selectively acting solution is therefore so small that no appreciable material loss takes place, in particular no appreciable reduction in the material thickness or else unavoidable etching near the surface outside the modified region takes place. As a result, the production of well-defined clearances and through-holes is possible by a combination of modifications in series with one another. There is no restriction with respect to the angle or the geometry of the clearances and through-holes.

Figures 3A, 3B, 3C:
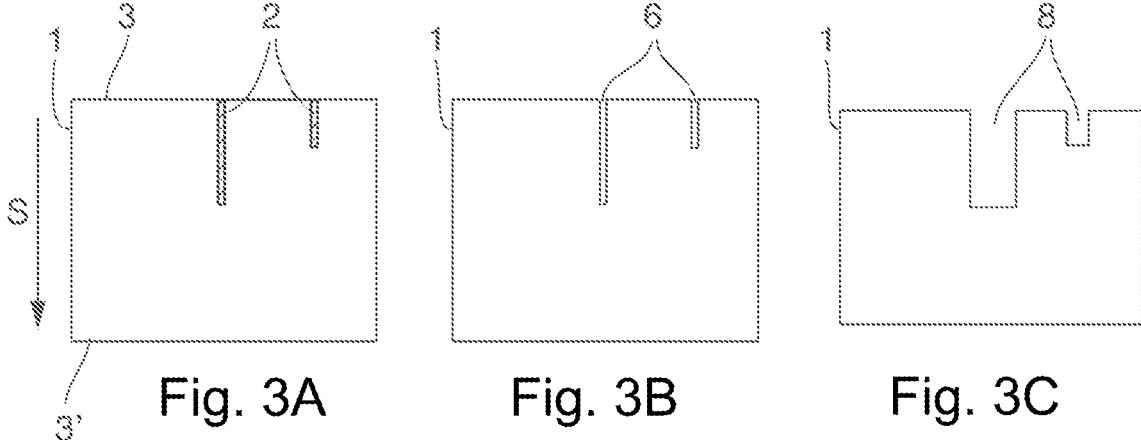
FIGS. 3A, 3B, and 3C show a schematic representation of a method for laser etching according to an embodiment of the invention.

In FIG. 3, an embodiment of a method according to the invention for laser etching is schematically shown. Here, drawn-out modifications 2 only reach into the workpiece 1 to a certain depth, as shown in FIG. 3*a*. Further adjacent modifications, which likewise only reach into the workpiece to this depth, are provided in front of and/or behind the plane of the drawing. The adjacent modifications may be spaced apart from one another, preferably at a spacing of up to five times the diameter of the individual modifications. FIG. 3*b* shows the workpiece 1 after the modified material has been attacked by the etching solution and removed in a first etching operation with high selectivity. As a result of the high selectivity of the etching operation, the unmodified material has not been attacked, or only insignificantly. As a result, in the workpiece 1 blind holes 6 with a diameter that remains essentially the same have been created, between which webs (not shown) of unmodified material remain.

In a second etching operation with low selectivity, the blind holes 6 created in the first etching operation can then be widened, so that the webs in between are removed. In this way, trenches 8 can be produced in the workpiece 1, as shown in FIG. 3*c*. By arranging the modifications 2 along any desired geometries, any desired geometries of trenches can be produced in the workpiece by the combination of selective etching and less selective etching.

Figures 4A, 4B, 4C:
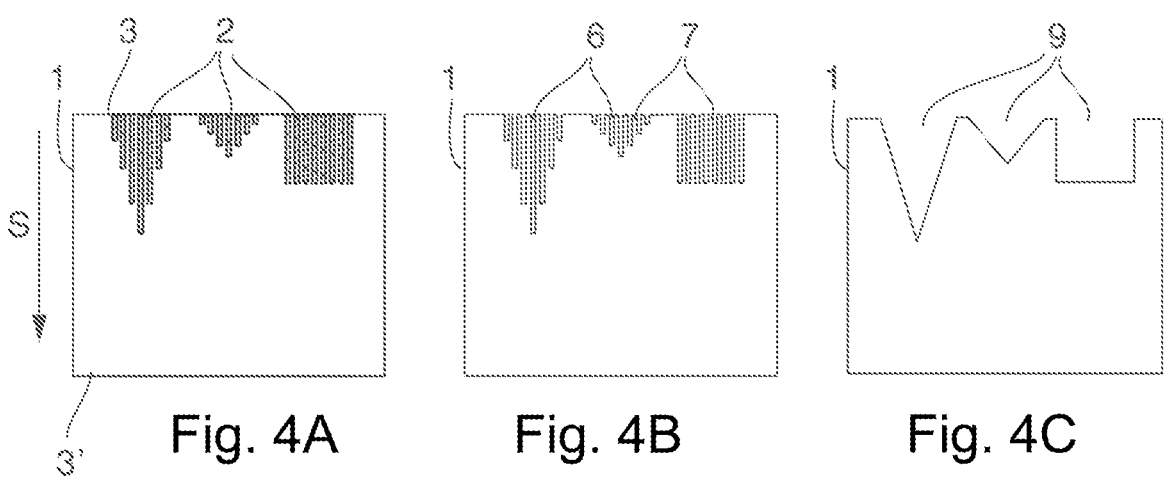
FIGS. 4A, 4B, and 4C show a schematic representation of a method for laser etching according to an embodiment of the invention.

In FIG. 4, an embodiment of a method according to the invention for laser etching is schematically shown. In this embodiment, clearances 9 are produced at one of the surfaces 3 of the workpiece 1 by separate etching operations with different selectivities. For this purpose, as shown in FIG. 4*a*, first multiple drawn-out modifications 2 are introduced into the material of the workpiece 1. The modifications 2 each extend from one surface 3 to a desired depth. In this case, the modifications 2 for a clearance 9 may have different lengths (see on the left and in the middle) and also the same length (see on the right). The modifications 2 are arranged essentially over the volume that is to be removed in the subsequent etching steps in order to produce the clearance 9. In this figure, as well as in all of the other figures, in each case a section through the workpiece 1 is shown and the modifications 2 lie in the sectional plane. It goes without saying that the modifications 2 may be arranged not only in a plane but also distributed in a volume.

In FIG. 4*b*, the workpiece 1 is shown after the modified material has been attacked by the etching solution and removed in a first etching operation with high selectivity. As a result of the high selectivity of the etching operation, the unmodified material has not been attacked, or only insignificantly. As a result, blind holes 6 with a diameter that remains essentially the same have been created in the workpiece 1. The unmodified material that has not been removed in the first etching operation remains between the blind holes 6 in the form of webs 7.

These webs 7 are attacked and removed in a second etching operation with low selectivity. The resultant workpiece 1 is shown in FIG. 4*c*. The removal of the modified material and the webs 7 has the effect of creating clearances 9 (in the example shown with a triangular cross section (on the left and in the middle) or a rectangular cross section (on the right), that is to say for example conical and cuboidal). In this way, clearances 9 with different shapes can be produced in a workpiece 1 within the same process.

Figures 5A, 5B, 5C, 5D:
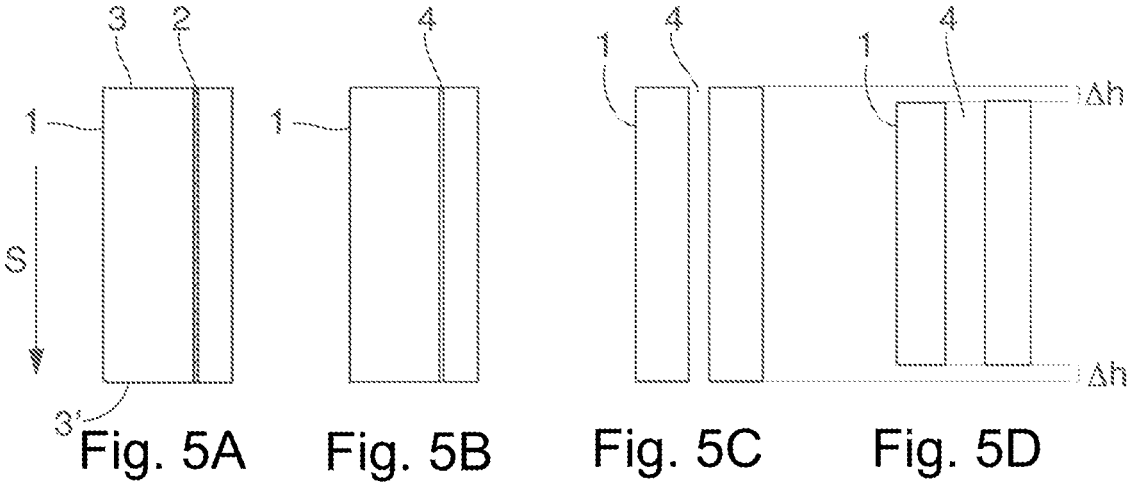
FIGS. 5A, 5B, 5C, and 5D show a schematic representation a method for laser etching according to an embodiment of the invention.

In FIG. 5, an embodiment of a method according to the invention for laser etching is schematically shown. In this embodiment, through-holes 4 through the workpiece 1 with a diameter that remains the same are produced by separate etching operations with different selectivities. For this purpose, as shown in FIG. 5*a*, first a drawn-out modification 2 is introduced into the material of the workpiece 1. The modification 2 extends all the way through from one surface 3 to the opposite surface 3'.

In FIG. 5*b*, the workpiece 1 is shown after the modified material has been attacked by the etching solution and removed in a first etching operation with high selectivity. As a result of the high selectivity of the etching operation, the unmodified material has not been attacked, or only insignificantly. As a result, a through-hole 4 with a diameter that remains essentially the same (corresponding to the diameter of the modification, for example less than 500 nm) has been created in the workpiece 1.

In a subsequent second etching operation with low selectivity, the diameter of the through-hole 4 is increased to the desired diameter, as shown in FIG. 5*c*. As a result of the etching solution being able to attack over the entire thickness of the workpiece 1 from the beginning in the second etching operation, the widening of the through-hole 4 takes place uniformly over its length. The widening of the through-hole 4 may be determined by way of the attack over time of the less selective etching solution. Here, too, with an etching attack that takes too long, there may be a reduction in the material thickness, as shown in FIG. 5*d*.

Figures 6A, 6B, 6C:
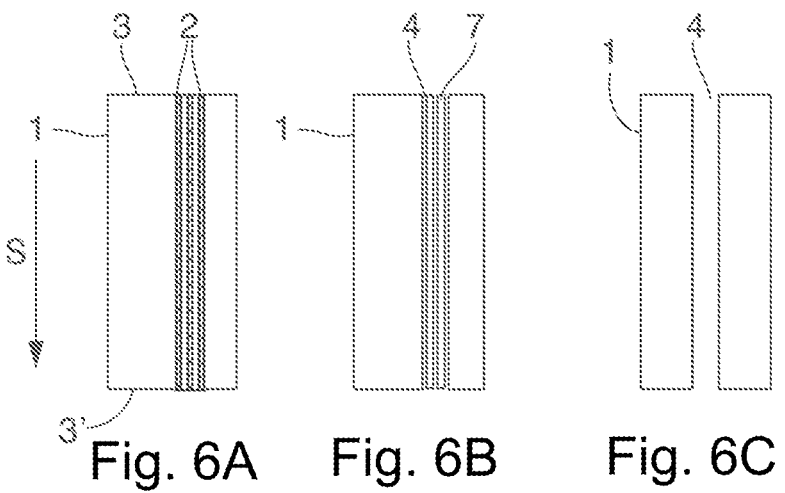
FIGS. 6A, 6B, and 6C show a schematic representation of a method for laser etching according to an embodiment of the invention.

A further embodiment of a method according to the invention with which through-holes 4 with a diameter that remains the same can be produced is schematically shown in FIG. 6. This embodiment offers higher flexibility with regard to the diameter of the through-holes 4 without excessive material loss, and consequently without excessive thickness reduction of the workpiece 1. For this purpose, as shown in FIG. 6*a*, first multiple drawn-out modifications 2 are introduced into the material of the workpiece 1. The modifications 2 each extend all the way through from one surface 3 to the opposite surface 3'. The modifications 2 are arranged essentially over the volume that is to be removed in the subsequent etching steps in order to produce the through-hole 4. In this figure, as well as in all of the other figures, in each case a section through the workpiece 1 is shown and the modifications 2 lie in the sectional plane. It goes without saying that the modifications 2 may be arranged not only in a plane but also distributed in a volume.

In FIG. 6*b*, the workpiece 1 is shown after the modified material has been attacked by the etching solution and removed in a first etching operation with high selectivity. As a result of the high selectivity of the etching operation, the unmodified material has not been attacked, or only insignificantly. As a result, through-holes 4 with a diameter that remains essentially the same (corresponding to the diameter of the modification, for example less than 500 nm, in glass often approximately 1 μm) have been created in the workpiece 1. The unmodified material that has not been removed in the first etching operation remains between the through-holes 4 in the form of webs 7.

These webs 7 are attacked and removed in a second etching operation with low selectivity. The resultant workpiece 1 is shown in FIG. 6*c*. As a result of the removal of the modified material and the webs 7, through-holes 4 with a diameter that remains the same have been created. In this way, multiple through-holes 4 with in each case a different diameter can be produced in a workpiece 1 within the same process, since the diameter of the holes is determined by way of the number of modifications 2 and not by way of the duration of the etching operation. Consequently, the resultant thickness of the workpiece is also not dependent on the diameter to be achieved.

Figures 7A, 7B, 8A, 8B, 8C, 8D, 8E, 9A, 9B, 9C:
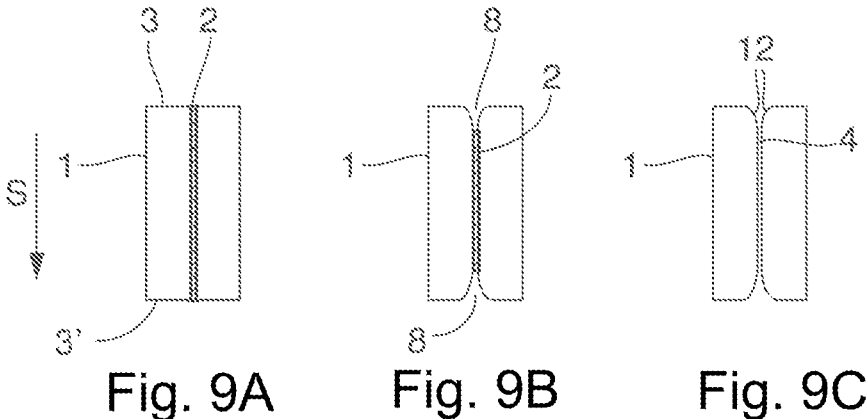
FIGS. 7A and 7B show a schematic representation of a workpiece which has been produced by a method according to an embodiment of the invention.
FIGS. 8A, 8B, 8C, 8D, and 8E show a schematic representation of a method for laser etching according to an embodiment of the invention.
FIGS. 9A, 9B, and 9C show a schematic representation of a method for laser etching according to an embodiment of the invention.

A schematic representation of a workpiece which has been produced by a method according to the invention is shown in FIG. 7. Multiple through-holes 4 with a diameter that remains the same over their length have been introduced into the workpiece 1, consisting of for example glass or sapphire. A cross section through the workpiece 1 in a plane A, in which there are multiple through-holes 4, is shown in FIG. 7*a*. It can be seen that the through-holes extend from one surface 3 of the workpiece 1 to the opposite surface 3'. By the method according to the invention, with a first etching step with high selectivity and a second etching step with low selectivity, the through-holes can be produced with any desired diameter, which is nevertheless essentially constant over their length. A plan view of the workpiece 1 is shown in FIG. 7*b*. It can be seen here that the workpiece 1 not only has through-holes 4 in the plane A, but also in planes parallel to the plane A. The spacing, number, arrangement and diameter of the through-holes 4 can be set as desired. Such a tool can be used for example as a nanosieve or microsieve. The dimensions of the workpiece 1 in this figure, as in the other figures, are not to scale. In particular, the workpiece may have a thickness which is very much smaller than its other dimensions such as length and width.

In FIG. 8, an embodiment of a method according to the invention for laser etching is schematically shown. The method is explained here on the basis of a plan view of the workpiece 1. In this embodiment, part of the workpiece 1 is detached from the rest of the workpiece by separate etching operations with different selectivities. For this purpose, as shown in FIG. 8*a*, first multiple drawn-out modifications 2 are introduced into the material of the workpiece 1. The modifications 2 extend all the way through from one surface 3 to the opposite surface 3'. The modifications 2 are arranged along a contour 10, shown here as a circle. The detail D is shown enlarged in FIGS. 8*b*, 8*c* and 8*d*.

In FIG. 8*b*, the workpiece 1 is shown in the form of a detail after the modified material has been attacked by the etching solution and removed in a first etching operation with high selectivity. As a result of the high selectivity of the etching operation, the unmodified material has not been attacked, or only insignificantly. As a result, through-holes 4 have been formed in the workpiece 1. The unmodified material that has not been removed in the first etching operation remains between the through-holes 4 in the form of webs 7.

These webs 7 are attacked and removed in a second etching operation with low selectivity, as shown in the form of a detail in FIG. 8*c*. Depending on the duration of the second etching operation, the width of the gap 11 thereby created between the part of the workpiece 1 to be detached and the rest of the workpiece 1 can be set. During the etching operation with low selectivity, normally the diameter of the through-holes 4 created in the first etching operation is also increased. This is not shown in the present schematic drawing. Also, dependent for example on the spacing between every two modifications, microcracks may be created between these modifications during the etching of the modified material, as a result of which the second etching operation with low selectivity proceeds with preference along the contour 10. In FIG. 8*d*, the workpiece 1 is shown in the form of a detail after a longer exposure time of the second etching operation than in FIG. 8*c*. The through-holes 4 produced in the first etching operation serve in this case as access for the etching solution of the second etching operation, which can consequently act over the entire thickness of the workpiece 1 from the beginning, so that the gap 11 has an essentially straight form over the thickness of the workpiece 1.

The workpiece 1 after the removal of the detached part is shown in FIG. 8*e*. The present method consequently also allows detachment or removal of parts of a workpiece from its interior.

In FIG. 9, an embodiment of a method according to the invention for laser etching is schematically shown. In this embodiment, a workpiece 1 is divided into two parts with rounded edges 12. For this purpose, as shown in FIG. 9*a*, first multiple drawn-out modifications 2 are introduced into the material of the workpiece 1 over the entire thickness of the workpiece 1. In FIG. 9*a*, only one modification 2 is shown; the further modifications are arranged adjacently in planes parallel to the plane of the drawing. Adjacent modifications may be formed as overlapping or non-overlapping, as described above with reference to FIG. 3. In one embodiment, the modifications have a diameter of approximately 1 μm and a spacing of at least 1 μm, so that adjacent modifications do not overlap, but at most just touch.

In FIG. 9*b*, the workpiece 1 is shown after both the modified material (partially) and the unmodified material have been attacked by the etching solution and removed in a first etching operation with low selectivity. This creates a trench 8 or (depending on the spacing of the modifications and duration of the first etching operation) a sequence of funnel-shaped depressions on both surfaces 3, 3' along the series of modifications 2. Since also in the case of an etching operation with low selectivity the modified material is preferably attacked, the trench 8 runs along the series of modifications 2. If adjacent modifications are non-overlapping (i.e. spaced apart from one another), in a further embodiment (not shown) a further modification passing all the way through may be additionally introduced along the contour, for example only reaching into the material of the workpiece over the depth of the desired rounding of the edges. During the first etching operation, a trench with rounded edges is then created along this modification passing all the way through.

In a subsequent second etching operation with high selectivity, then (predominantly) only the modified material is removed, so that the two parts of the workpiece can be separated from one another, as shown in FIG. 9*c*. The round walls of the trench 8 now provide respectively rounded edges 12 of the two parts of the workpiece 1.

In an embodiment that is not shown, a rounding of the opening of through-holes and blind holes or of the edges of trenches can also be achieved with a method according to the invention in a way corresponding to the method of FIG. 9, by the corresponding, previously described methods being preceded by an etching operation with low selectivity in which a funnel-shaped depression is produced around the modification.

The edges may also be straightened, and consequently polished, by a further short etching operation with low selectivity.

Figures 10A, 10B, 10C, 10D:
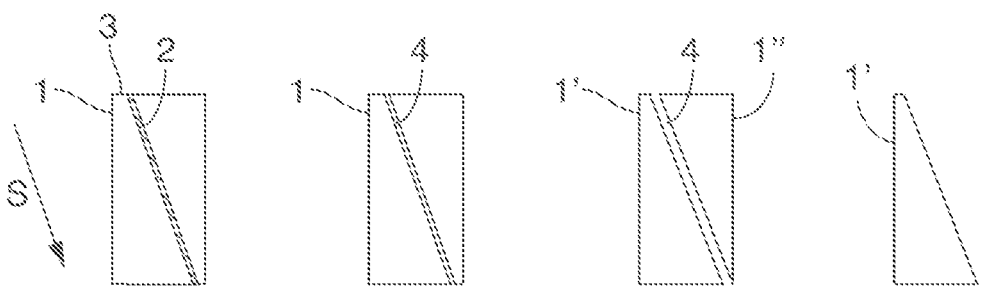
FIGS. 10A, 10B, 10C, and 10D show a schematic representation of a method for laser etching according to an embodiment of the invention.

In FIG. 10, an embodiment of a method according to the invention for laser etching is schematically shown. In this embodiment, a workpiece 1 is divided into two parts. For this purpose, as shown in FIG. 10*a*, first multiple drawn-out modifications 2 are introduced into the material of the workpiece 1 obliquely through the workpiece 1 over the entire thickness of the workpiece 1. In FIG. 10*a*, only one modification 2 is shown; the further modifications are arranged adjacently in planes parallel to the plane of the drawing. Adjacent modifications may be formed as overlapping or non-overlapping, as described above with reference to FIG. 3. In one embodiment, the modifications have a diameter of approximately 1 µm and a spacing of at least 1 µm, so that adjacent modifications do not overlap, but at most just touch. Each of the drawn-out modifications 2 may be produced either by means of a laser beam that is obliquely incident on the surface 3 of the workpiece 1 and has a longitudinally extended intensity profile (for example a Bessel beam with a drawn-out focal zone) or by step-shaped series of multiple modifications. The latter may be advantageous in particular in the case of a relatively large angle.

Multiple modifications in step-shaped series may for example be produced one after the other by a Bessel beam with a short focal zone at different distances from the surface 3 of the workpiece 1 (or correspondingly by a Gaussian beam with a focal point at different distances from the surface 3 of the workpiece 1). The differing distance of the focal zone from the surface of the workpiece may be achieved for example by setting the distance between the laser and the workpiece or by different beam shaping of the laser beam. Multiple modifications in step-shaped series may also be produced by a so-called multispot laser beam, which is for example formed by beam shaping such that it has an extent in a direction perpendicular to the beam direction, the focal position varying along the direction perpendicular to the beam direction. Such a beam may also be regarded as multiple parallel beams, each with a different focal position. The beam direction S, indicated in FIG. 10*a*, corresponds to the variant with a turned-on Bessel beam.

In FIG. 10*b*, the workpiece 1 is shown after the modified material has been attacked by the etching solution and removed in a first etching operation with high selectivity. As a result of the high selectivity of the etching operation, the unmodified material has not been attacked, or only insignificantly. As a result, through-holes 4 have been formed in the workpiece 1. The unmodified material that has not been removed in the first etching operation remains between the through-holes 4 in the form of webs (not shown).

These webs are attacked and removed in a second etching operation with low selectivity, as shown in FIG. 10*c*. As a result, the workpiece 1 is divided into two parts 1', 1". During the etching operation with low selectivity, the through-holes 4 created in the first etching operation are enlarged and the webs in between are removed. Also, dependent for example on the spacing between every two modifications, microcracks may be created between these modifications during the modification of the material, as a result of which the second etching operation with low selectivity proceeds with preference through the webs.

In FIG. 10*d*, the part of the workpiece 1' is shown after the detached part 1" has been removed.

In FIG. 11, an embodiment of a method according to the invention for laser etching is schematically shown. Depending on process and/or material parameters, a wide variety of material modifications can occur. If regions that are modified all the way through over the thickness of the workpiece are not possible or desired, etching all the way through may selectively not take place. For example, round or elongate material modifications may be arranged in the manner of a chain in the direction of beam propagation (longitudinal multispots), as shown in FIG. 1*a*. Specifically if stresses are intended to be as small as possible during modifying, multispot modifications may be advantageous in comparison with drawn-out modifications all the way through.

In order in such cases to be able nevertheless to produce a through-hole 4 through the workpiece 1, in particular with a diameter that is as constant as possible, switching repeatedly between an etching operation with high selectivity and an etching operation with low selectivity may be carried out. During the etching operations with high selectivity, the modified material that is externally accessible for the etching solution is removed (see FIG. 11*b* and FIG. 11*d*). As a result of the high selectivity of the etching operation, the unmodified material is not attacked, or only insignificantly. As a result, undesired widening of the diameter can be avoided as far as possible.

Figures 11A, 11B, 11C:
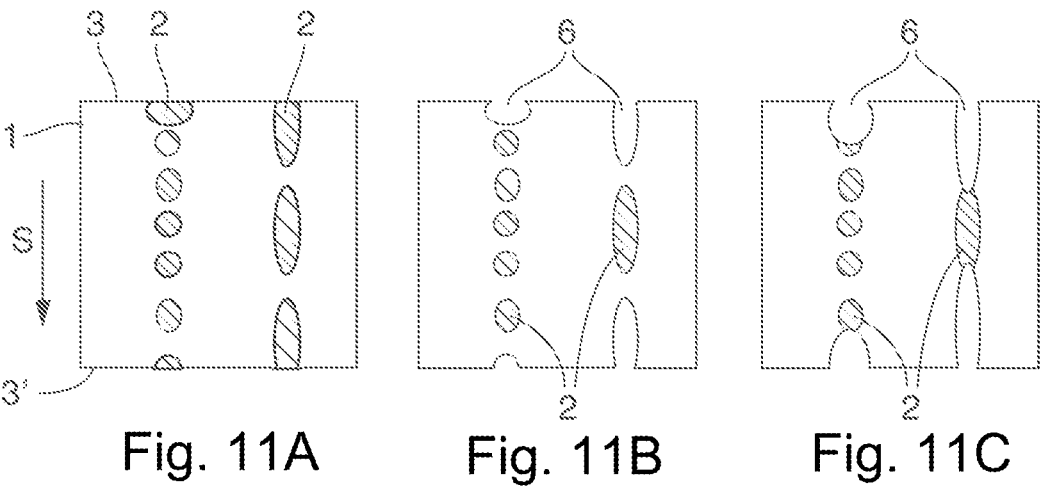
FIGS. 11A, 11B, 11C, 11D, 11E, and 11F show a schematic representation of a method for laser etchng according to an embodiment of the invention.
Figures 11D, 11E, 11F:
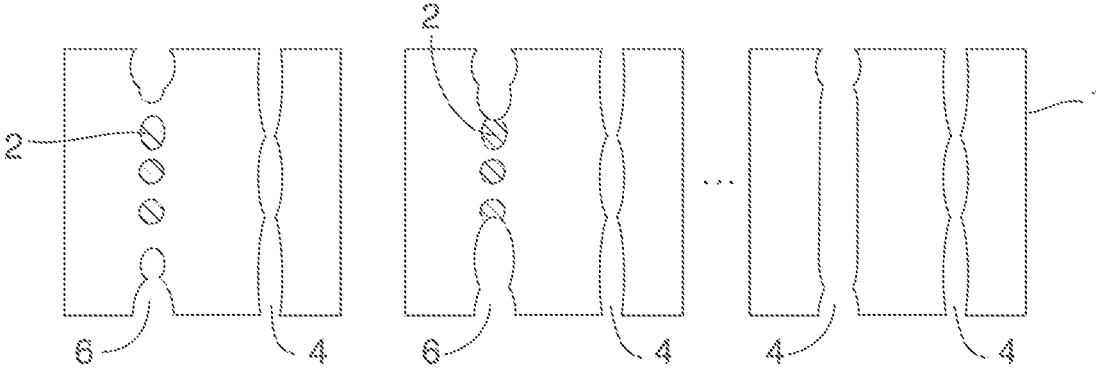

During the etching operations with low selectivity, the unmodified material is also removed, so that after that the modified material is accessible again (see FIG. 11*c* and FIG. 11*e*). In the next etching operation with high selectivity, then again the modified material accessible for the etching solution is removed. After repeated switching between the etching operations with high selectivity and with low selectivity, a through-hole 4 is then created through the workpiece 1, as shown in FIG. 11*f*.

It can be ensured by such alternating etching, i.e. alternating etching operations with high selectivity and with low selectivity, that through-holes and blind holes have the desired length, even if the modification is not formed completely homogeneously in the longitudinal direction.

With the method presented here, any desired diameters of through-holes and clearances from several hundred nanometers to several millimeters can be produced. Since the material loss can be kept to a minimum by etching with low selectivity, the achievable dimensions are not dependent on the material thickness of the workpiece.

Figure 12:
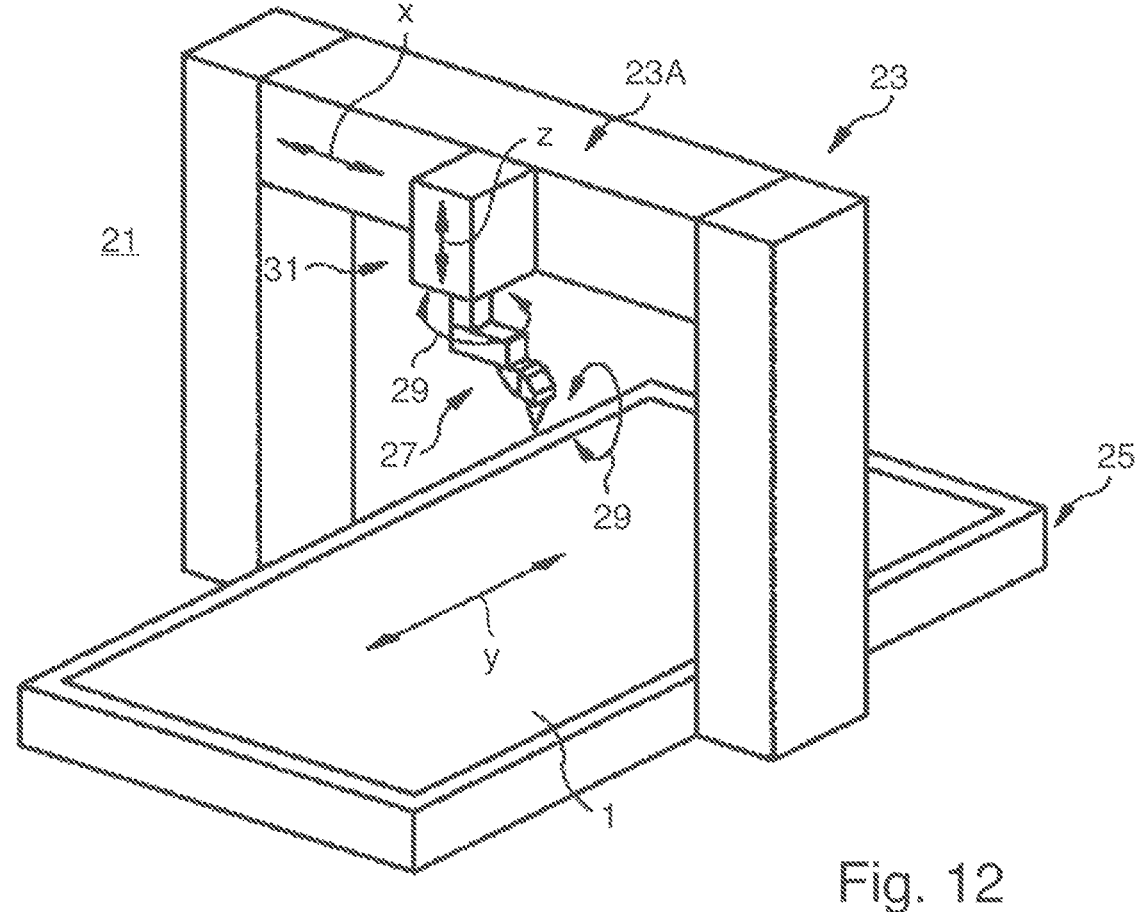
FIG. 12 shows a schematic representation of a laser machining device for modifying the material of a workpiece according to an embodiment of the invention.

In the laser machining installation 21 shown in FIG. 12, an optical system 31 may be used for example for the modification of the material of a workpiece 1. The laser machining installation 21 has a carrier system 23 and a workpiece mounting unit 25. The carrier system 23 spans the workpiece mounting unit 25 and carries a laser system, which in FIG. 12 is integrated for example in an upper cross member 23A of the carrier system 23. Furthermore, the optical system 31 is attached to the cross member 23A movably in the X direction, so that both components are arranged locationally close to one another. In alternative embodiments, for example, the laser system may be provided as an external unit of its own, the laser beam of which is guided to the optical system 31 by means of optical fibers or as a free beam.

The workpiece mounting unit 25 carries a workpiece 1 extending in the X-Y plane, for example a sheet of glass or a sheet that is largely transparent to the laser wavelength used, made of a ceramic or crystalline material, such as for example sapphire or silicon. The workpiece mounting unit 25 allows moving of the workpiece in the Y direction in relation to the carrier system 23, so that, in combination with the moving capability of the optical system 31, a machining region extending in the X-Y plane is available.

According to FIG. 12, furthermore, displaceability in the Z direction, for example of the optical system 31 or the cross member 23A, is provided, in order to be able to set the distance from the workpiece. For a modification running in the Z direction, the laser beam is usually also directed onto the workpiece in the Z direction (i.e. normal to it). However, further machining axes may be provided, as indicated in FIG. 12 by way of example by a boom assembly 27 and the additional axes of rotation 29. Correspondingly, the boom assembly 27 in the configuration according to FIG. 12 is optional. Furthermore, redundant additional axes may be provided for greater dynamics, for example by it not being the workpiece or the optical system that is accelerated, but a more compact and appropriately designed component.

The laser machining installation 21 also has a not explicitly shown controller, which is for example integrated in the carrier system 23 and has in particular an interface for the input of operating parameters by a user. Generally, the controller comprises elements for activating electrical, mechanical and optical components of the laser machining installation 21, for example by activating corresponding operating parameters, such as for example pumping laser power, cooling power, direction and speed of the laser installation and/or the workpiece mounting, electrical parameters for the setting of an optical element (for example an SLM) and the spatial alignment of an optical element (for example for turning the same).

Further arrangements for laser machining installations with a wide variety of degrees of freedom are disclosed for example in EP 1 688 807 A1. Generally, in the case of small workpieces, often only the workpiece is moved and, in the case of rather large workpieces, only the laser beam is moved or—as in FIG. 12—the workpiece and the laser beam are moved. Moreover, two or more optical systems, and consequently focal zones, may be provided for by one laser system.

The modifications in the material that are produced by laser machining installations can be used for selective laser etching. Accordingly, it is important to be able to suitably check both the geometry and the type of the modification. Apart from parameters such as laser wavelength, pulse shape over time, number of pulses, energy and time interval of the pulses in a pulse group producing a single modification and also pulse energy or pulse group energy, the beam shape plays a decisive role here.

In particular, a drawn-out volume modification allows machining over a volume region with a long extent in the direction of beam propagation in a single machining step. In particular, at one location in the advancing direction, the machining can take place over a great extent in only a single modification machining step.

Furthermore, a drawn-out focal zone may be helpful in the machining of uneven materials, since essentially identical laser machining conditions prevail along the drawn-out focal zone, so that in such embodiments corresponding tracking in the direction of propagation may not be necessary, or only as from when there is a greater deviation in the position of the material to be machined than the length of the drawn-out focal region (taking into consideration the required machining depth/depth of penetration).

It is generally true for the machining of transparent materials by means of drawn-out volume absorption that, as soon as an absorption takes place, this absorption itself, or else the resultant changing of the material property, can influence the propagation of the laser beam. It is therefore advantageous if beam components that are intended to bring about a modification deeper in the workpiece, that is to say downstream of the beam in the direction of beam propagation, are essentially not guided through regions of appreciable absorption.

In other words, it is therefore favorable to feed the beam components that serve for the modification further downstream of the beam to the zone of interaction at an angle. An example of this is the quasi-Bessel beam, in the case of which there is an annular far field distribution, the width of the ring of which is typically small in comparison with the radius. The beam components of the zone of interaction are in this case fed essentially at this angle rotationally symmetrically. The same applies to the inverse quasi-Bessel beam or to modifications and supplementations of the same such as the homogenized or modulated inverse quasi-Bessel beam. A further example is the inverse accelerated "quasi-Airy beam-like" beam, in the case of which the beam components are fed to the modification at an offset angle, this taking place, by way of illustration, tangentially—and not rotationally symmetrically as in the case of the purely quasi-Bessel beam—to the curved modification zone, for example as in the case of a curved inverse quasi-Bessel beam.

It should also be endeavored only to exceed the threshold for the non-linear absorption appreciably in the intended volume region and to choose the geometry of this volume region such that on the one hand it is suitable for the desired application, but on the other hand it does not significantly disturb the propagation to further volume regions lying downstream of the beam. For example, it may be advantageous to keep secondary maxima of an apodized Bessel beam profile below a threshold intensity required for the non-linear absorption.

With regard to modifications following one another in the advancing direction, the geometry of the modified volume may also be chosen such that, when multiple modifications are arranged in series in the advancing direction, a previously introduced modification only has an insignificant influence on the formation of the then-following modifications.

For rapid machining, the production of a single modification may take place with just a single laser pulse/a single laser pulse group, so that a position on the workpiece is in this case only approached once.

Ultrashort pulse lasers can make it possible to provide intensities (power densities) that allow a sufficiently great material modification to be caused in correspondingly long zones of interaction. The geometrical extent of the modification is in this case fixed with the aid of the beam shaping in such a way that a high free electron density of a long extent is produced by non-linear absorption in the material. The feeding of the energy into deeper regions takes place laterally, so that the shielding effect is prevented by earlier interaction of the plasma in comparison with Gaussian focusing. For example, an electron density that is made to extend uniformly in the longitudinal direction or a spatially high-frequency-modulated electron density may be produced.

With corresponding intensities, in regions with sufficiently high free electron density there may be an explosive expansion of the material, the shockwave thereby created being able to produce nanoscopic holes (nanovoids). Further examples of modifications (modification zones) are changes in refractive index, compressed and/or tensile-stress-inducing regions, microcrystallites and local changes in stoichiometry.

The modification geometry is in this case determined primarily by the beam shaping (and not by non-linear propagation, such as for example of filamentation). Spatial gradients may be produced by the optical systems, temporal gradients may be produced by pulse trains or pulse shaping.

Generally, scaling of the intensity distribution of a beam shape may be provided by the imaging ratio of the system, in particular by the focal length and the numerical aperture of the near field optics of the imaging system. Further possibilities for scaling are provided by the use of an additional lens and also the displacement of the beam shaping element and/or the far field optics. As a result, the lateral and longitudinal extent of the beam profile in the workpiece can be influenced. Furthermore, spatial filters and stops may be used in the beam path for beam shaping in order to prepare the beam.

Laser beam parameters, for example for ultrashort pulse laser systems, and parameters of the optical system and the drawn-out focal zone that can be used within the scope of this disclosure are, by way of example:

pulse energy Ep: 1 µJ to 10 mJ (for example 20 µJ to 1000 µJ), energy of a pulse group Eg: 1 µJ to 10 mJ wavelength ranges: IR, VIS, UV (for example 2 µm>λ>200 nm; for example 1550 nm, 1064 nm, 1030 nm, 515 nm, 343 nm)

pulse duration (FWHM): 10 fs to 50 ns (for example 200 fs to 20 ns)

exposure time (dependent on advancing rate): less than 100 ns (for example 5 ps-15 ns)

duty cycle (exposure time to repetition time of the laser pulse/the pulse group): less than or equal to 5%, for example less than or equal to 1% raw beam diameter D (1/e2) when entering the optical system: for example in the range from 1 mm to 25 mm focal length of the near field optic: 3 mm to 100 mm (for example 10 mm to 20 mm)

numerical aperture NA of the near field optic: $0.15 \leq NA \leq 0.5$ length of the beam profile in the material: greater than 20 µm maximum lateral extent of the beam profile in the material, possibly in the short direction: less than 20λ, aspect ratio: greater than 20 modulation in direction of propagation: greater than 10 periods over focal zone advancement dv between two adjacent modifications, for example for use in separating:

100 nm<dv<10*lateral extent in advancing direction advancement during exposure time: for example less than 5% of the lateral extent in the advancing direction The pulse duration relates here to a laser pulse and the exposure time relates to a time range in which for example a group of laser pulses for forming a single modification at one location interacts with the material. The exposure time is short here with respect to the present advancing rate, so that all of the laser pulses of a group contribute to a modification at one location.

If the workpiece is thinner than the focal zone is long, the focal zone lies partially outside the workpiece, so that there may be modifications that are shorter than the focal zone. Such a situation can be advantageously exploited to make the machining process robust even when there is a variation of the distance between the optics and the workpiece. In some embodiments, a modification that does not reach through the entire workpiece may be advantageous. In particular, the length of the focal zone and/or its location in the workpiece may be adapted. Generally, it should be noted here that, on account of different thresholds for the non-linear absorption, a focal zone with an assumed identical intensity can bring about modifications of different sizes in different materials.

The aspect ratio concerns the geometry of the beam profile (the focal zone) in the material to be machined and also the geometry of the modification produced with a beam profile. In the case of asymmetric beam profiles or beam profiles modulated in the lateral direction (for example not rotationally symmetrical or annular), the aspect ratio is determined by the ratio of the length of the modification to a maximum lateral extent in the shortest direction occurring within this length range. If the beam profile has here a modulation in the lateral direction, for example in the case of annular beam profiles, the aspect ratio relates to the width of a maximum, in the case of an annular beam profile that is to say for example the thickness of the ring. In the case of a formation of multiple modification volumes spaced apart in the lateral direction, the aspect ratio relates to the lateral extent of the individual modification. In the case of a beam profile modulated in the direction of propagation (for example on account of interferences), the aspect ratio is referred to the primary overall length.

On the basis of a distance d between the beam shaping element and the focusing lens (near field optics), which is in particular greater than the focal length $f_N$ of the near field optics, and an NA of the near field optics with respect to air >0.15, the used angle spectrum α of the beam shaping element may lie in the range $\tan(\lambda)<f^*NA/d<NA/2$, and preferably $\tan(\alpha)>f^*NA/(d^*4)$.

Insofar as applicable, all individual features presented in the exemplary embodiments can be combined with one another and/or interchanged, without departing from the scope of the invention.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Workpiece
2 Modifications
3, 3' Surfaces
4 Through-holes
5 Hourglass-shaped through-hole
6 Blind holes
7 Webs
8 Trenches
9 Clearances
10 Contour
11 Gap
12 Rounded edge
21 Laser machining installation
23 Carrier system
23A Cross member
25 Workpiece mounting unit
27 Boom assembly
29 Axes of rotation
31 Optical system

What is claimed is:

1. A method for machining a workpiece, the method comprising:
  introducing a plurality of adjacent modifications into a material of the workpiece by laser radiation, the plurality of adjacent modifications being distributed over a volume of the material of the workpiece,
  etching the material of the workpiece in a first etching operation with a first selectivity, in order to remove predominantly the material modified by the laser radiation, and
  after completion of the first etching operation, etching the material of the workpiece in a second etching operation with a second selectivity different from the first selectivity, in order to remove webs left in the volume between the removed modified material,
  wherein at least some of the plurality of adjacent modifications introduced into the material of the workpiece have different lengths in a direction of propagation of the laser radiation so that, after completion of the first etching operation, a plurality of adjacent blind holes are created, and after completion of the second etching operation, the webs left between the adjacent blind holes are removed.

2. The method as claimed in claim 1, wherein the first etching operation and the second etching operation differ by chemical composition, a temperature and/or a concentration of etching solutions and/or by ultrasonic power introduced in an ultrasonic bath.

3. The method as claimed in claim 1, wherein the first selectivity and the second selectivity differ by at least a factor of 2.

4. The method as claimed in claim 1, wherein the first selectivity is greater than the second selectivity.

5. The method as claimed in claim 1, wherein, after completion of the second etching operation, one or more further etching operations take place, each with a different selectivity.

6. The method as claimed in claim 1, wherein the material of the workpiece is transparent to a wavelength of the laser radiation.

7. The method as claimed in claim 1, wherein the modifications are introduced into the material of the workpiece by ultrashort laser pulses.

8. The workpiece with a plurality of drawn-out holes, wherein each of the plurality of drawn-out holes is produced by a method as claimed in claim 1.

9. A method for machining a workpiece, the method comprising:
  introducing a plurality of adjacent modifications into a material of the workpiece by laser radiation, the plurality of adjacent modifications being distributed over a volume of the material of the workpiece,
  etching the material of the workpiece in a first etching operation with a first selectivity, in order to remove predominantly the material modified by the laser radiation, and
  after completion of the first etching operation, etching the material of the workpiece in a second etching operation with a second selectivity different from the first selectivity, in order to remove webs left in the volume between the removed modified material,
  wherein at least some of the plurality of adjacent modifications introduced into the material of the workpiece have different lengths in a direction of propagation of the laser radiation so that, after completion of the second etching operation, an hourglass-shaped through hole is formed in the workpiece.

* * * * *